US010642693B2

(12) United States Patent
Kantor et al.

(10) Patent No.: US 10,642,693 B2
(45) Date of Patent: May 5, 2020

(54) SYSTEM AND METHOD FOR SWITCHING FIRMWARE

(71) Applicant: Western Digital Technologies, Inc., San Jose, CA (US)

(72) Inventors: Beniamin Kantor, Kfar Saba (IL); Judah Gamliel Hahn, Ofra (IL); Ilya Gusev, Gedera (IL)

(73) Assignee: Western Digital Technologies, Inc., San Jose, CA (US)

( * ) Notice: Subject to any disclaimer, the term of this patent is extended or adjusted under 35 U.S.C. 154(b) by 197 days.

(21) Appl. No.: 15/696,913

(22) Filed: Sep. 6, 2017

(65) Prior Publication Data
US 2019/0073268 A1 Mar. 7, 2019

(51) Int. Cl.
*G06F 11/00* (2006.01)
*G06F 11/14* (2006.01)
(Continued)

(52) U.S. Cl.
CPC .......... *G06F 11/142* (2013.01); *G06F 3/0653* (2013.01); *G06F 11/0727* (2013.01); *G06F 11/0754* (2013.01); *G06F 11/1433* (2013.01); *G06F 11/3034* (2013.01); *G06F 11/3636* (2013.01); *G06F 11/3644* (2013.01); *G06F 2201/805* (2013.01)

(58) Field of Classification Search
CPC ............. G06F 11/1433; G06F 11/1415; G06F 11/362; G06F 11/3664
See application file for complete search history.

(56) References Cited

U.S. PATENT DOCUMENTS 5,399,919 A * 3/1995 Mair ..................... G06F 7/5016
326/106
5,611,061 A * 3/1997 Yasuda ................... G06F 9/322
712/244
(Continued)

OTHER PUBLICATIONS

How to Upgrade Samsung SSD Firmware Storage Review http://www.storagereview.com/samsung_magician_and_data_migration_overview Dec. 2015, 3 pages.
(Continued)

*Primary Examiner* — Bryce P Bonzo
*Assistant Examiner* — Jeison C Arcos
(74) *Attorney, Agent, or Firm* — Vierra Magen Marcus LLP

(57) ABSTRACT

The present disclosure provides a system and method for switching firmware autonomously by a storage controller. The system and method include determining, by a switcher module of the storage controller, satisfaction of a debug condition based upon values of parameters of the debug condition. The debug condition is indicative of a problem within a storage system that includes the storage controller that facilitates communication between a host device and a non-volatile storage of the storage system. The system and method further include switching, by the switcher module, operation of the storage system from a primary firmware to a secondary firmware based upon the determination of the switcher module that the debug condition has been satisfied. The switching from the primary firmware to the secondary firmware occurs automatically without a switching request from the host device.

20 Claims, 5 Drawing Sheets

(51) Int. Cl.
*G06F 11/36* (2006.01)
*G06F 11/07* (2006.01)
*G06F 3/06* (2006.01)
*G06F 11/30* (2006.01)

(56) References Cited

U.S. PATENT DOCUMENTS

| | | | | |
|---|---|---|---|---|
| 5,832,492 | A * | 11/1998 | Wooten | G06F 13/102 |
| 6,675,258 | B1 * | 1/2004 | Bramhall | G06F 8/65 |
| | | | | 711/100 |
| 6,754,895 | B1 * | 6/2004 | Bartel | G06F 8/65 |
| | | | | 717/171 |
| 7,073,017 | B2 * | 7/2006 | Yamamoto | G06F 8/65 |
| | | | | 711/103 |
| 7,171,653 | B2 * | 1/2007 | Albrecht | G06F 9/455 |
| | | | | 714/E11.21 |
| 7,302,690 | B2 * | 11/2007 | Harrington | G06F 9/4812 |
| | | | | 710/269 |
| 7,317,690 | B2 * | 1/2008 | Oi | H04L 45/00 |
| | | | | 370/241 |
| 7,426,633 | B2 * | 9/2008 | Thompson | G06F 8/65 |
| | | | | 713/1 |
| 7,809,836 | B2 * | 10/2010 | Mihm | G06F 8/65 |
| | | | | 709/227 |
| 7,996,726 | B2 | 8/2011 | Ito | |
| 8,943,226 | B1 | 1/2015 | Hoglund et al. | |
| 9,189,385 | B2 | 11/2015 | Cohen et al. | |
| 9,223,563 | B2 | 12/2015 | Stenfort et al. | |
| 9,430,358 | B1 * | 8/2016 | Thayer | G06F 11/3688 |
| 10,191,852 | B2 * | 1/2019 | Petkov | G06F 12/1009 |
| 2003/0014207 | A1 * | 1/2003 | Arnaout | G06F 3/0626 |
| | | | | 702/119 |
| 2003/0014209 | A1 * | 1/2003 | Arnaout | G06F 11/2294 |
| | | | | 702/122 |
| 2003/0191607 | A1 * | 10/2003 | Arndt | G06F 11/2236 |
| | | | | 702/186 |
| 2003/0221092 | A1 * | 11/2003 | Ballard | G06F 9/4401 |
| | | | | 713/1 |
| 2004/0015941 | A1 * | 1/2004 | Sekine | G06F 8/65 |
| | | | | 717/168 |
| 2004/0153810 | A1 * | 8/2004 | Kuo | G06F 11/362 |
| | | | | 714/36 |
| 2004/0202030 | A1 * | 10/2004 | Herron | G06F 9/30043 |
| | | | | 365/199 |
| 2004/0216003 | A1 * | 10/2004 | Floyd | G06F 11/0727 |
| | | | | 714/25 |
| 2005/0132351 | A1 * | 6/2005 | Randall | G06F 11/1433 |
| | | | | 717/168 |
| 2005/0188170 | A1 * | 8/2005 | Yamamoto | G06F 8/65 |
| | | | | 711/170 |
| 2006/0091828 | A1 * | 5/2006 | Bruno | G01R 19/2513 |
| | | | | 315/292 |
| 2006/0095644 | A1 * | 5/2006 | Fujita | G06F 13/4027 |
| | | | | 710/313 |
| 2006/0184840 | A1 * | 8/2006 | Floyd | G06F 11/0724 |
| | | | | 714/48 |
| 2007/0143589 | A1 * | 6/2007 | Rawe | G06F 9/441 |
| | | | | 713/2 |
| 2008/0046710 | A1 * | 2/2008 | Maddocks | G06F 8/656 |
| | | | | 713/2 |
| 2008/0052506 | A1 * | 2/2008 | Iima | G06F 11/1417 |
| | | | | 713/1 |
| 2008/0320110 | A1 * | 12/2008 | Pathak | G06F 11/1433 |
| | | | | 709/220 |
| 2009/0013313 | A1 * | 1/2009 | Kato | G06F 11/3624 |
| | | | | 717/129 |
| 2009/0140872 | A1 * | 6/2009 | O'Neal | G05B 9/03 |
| | | | | 340/679 |
| 2009/0210752 | A1 | 8/2009 | Bartik et al. | |
| 2009/0210867 | A1 * | 8/2009 | Suzuki | G06F 8/65 |
| | | | | 717/168 |
| 2009/0222692 | A1 * | 9/2009 | Robertson | G06F 11/2236 |
| | | | | 714/25 |
| 2010/0011134 | A1 * | 1/2010 | Brockmann | G06F 8/656 |
| | | | | 710/14 |
| 2010/0058316 | A1 * | 3/2010 | Ha | G06F 11/1433 |
| | | | | 717/170 |
| 2011/0035618 | A1 * | 2/2011 | Jann | G06F 11/0712 |
| | | | | 714/3 |
| 2012/0311275 | A1 * | 12/2012 | Muramatsu | G06F 11/201 |
| | | | | 711/154 |
| 2014/0289707 | A1 | 9/2014 | Guan et al. | |
| 2014/0344960 | A1 | 11/2014 | Adams | |
| 2015/0248334 | A1 * | 9/2015 | Lucas | G06F 11/1433 |
| | | | | 714/23 |
| 2016/0070486 | A1 | 3/2016 | Anderson et al. | |
| 2016/0162375 | A1 | 6/2016 | Kim | |
| 2016/0282930 | A1 * | 9/2016 | Ramachandran | G06F 1/3296 |
| 2016/0378587 | A1 * | 12/2016 | Zhang | G06F 11/0757 |
| | | | | 714/55 |
| 2017/0115350 | A1 * | 4/2017 | Zhang | G01R 31/31705 |

OTHER PUBLICATIONS

International Search Report and Written Opinion dated Sep. 5, 2018, for PCT Application No. PCT/US2018/035975.

* cited by examiner

SYSTEM AND METHOD FOR SWITCHING FIRMWARE

BACKGROUND

The following description is provided to assist the understanding of the reader. None of the information provided or references cited is admitted to be prior art.

Non-volatile storage devices are used in a variety of applications ranging from simple consumer electronics to complex enterprise based computing systems. At least some non-volatile storage devices are configured to communicate with a host device via a storage controller. The storage controller executes firmware level code to operate, manage, and otherwise control the non-volatile storage device in facilitating the communication between the host device and the non-volatile storage device. The non-volatile memory express (NVMe) standard is an example of an interface that outlines a communication protocol between the host device and the non-volatile storage device via the storage controller. One of the features of the NVMe standard allows multiple firmware revisions to be simultaneously installed on the non-volatile storage device. However, the storage controller is limited in the way it manages and operates the multiple firmware revisions.

SUMMARY

In accordance with some aspects of the present disclosure, a method is disclosed. The method includes determining, by a switcher module of a storage controller, satisfaction of a debug condition based upon values of parameters of the debug condition. The debug condition is indicative of a problem within a storage system including the storage controller that facilitates communication between a host device and a non-volatile storage of the storage system. The method further includes switching, by the switcher module, operation of the storage system from a primary firmware to a secondary firmware based upon the determination of the switcher module that the debug condition has been satisfied. The switching from the primary firmware to the secondary firmware occurs automatically without a switching request from the host device.

In accordance with some other aspects of the present disclosure, a storage controller is disclosed. The storage controller includes a plurality of firmware slots, a first slot of the plurality of firmware slots having a primary firmware installed therein and a second slot of the plurality of firmware slots having a secondary firmware installed therein. The storage controller also includes a switcher module configured to automatically switch between the primary firmware and the secondary firmware based upon satisfaction of one or more conditions. The switcher module switches between the primary firmware and the secondary firmware without a switching request from a host device that is in communication with the storage controller.

In accordance with yet other aspects of the present disclosure, a storage system is disclosed. The storage system includes a host device, a non-volatile storage, and a storage controller. The storage controller is configured to facilitate communication between the host device and the non-volatile storage. Further, the storage controller includes a switcher module configured to automatically switch between a primary firmware and a secondary firmware based upon satisfaction of one or more conditions. The switcher module switches between the primary firmware and the secondary firmware without a switching request from the host device.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
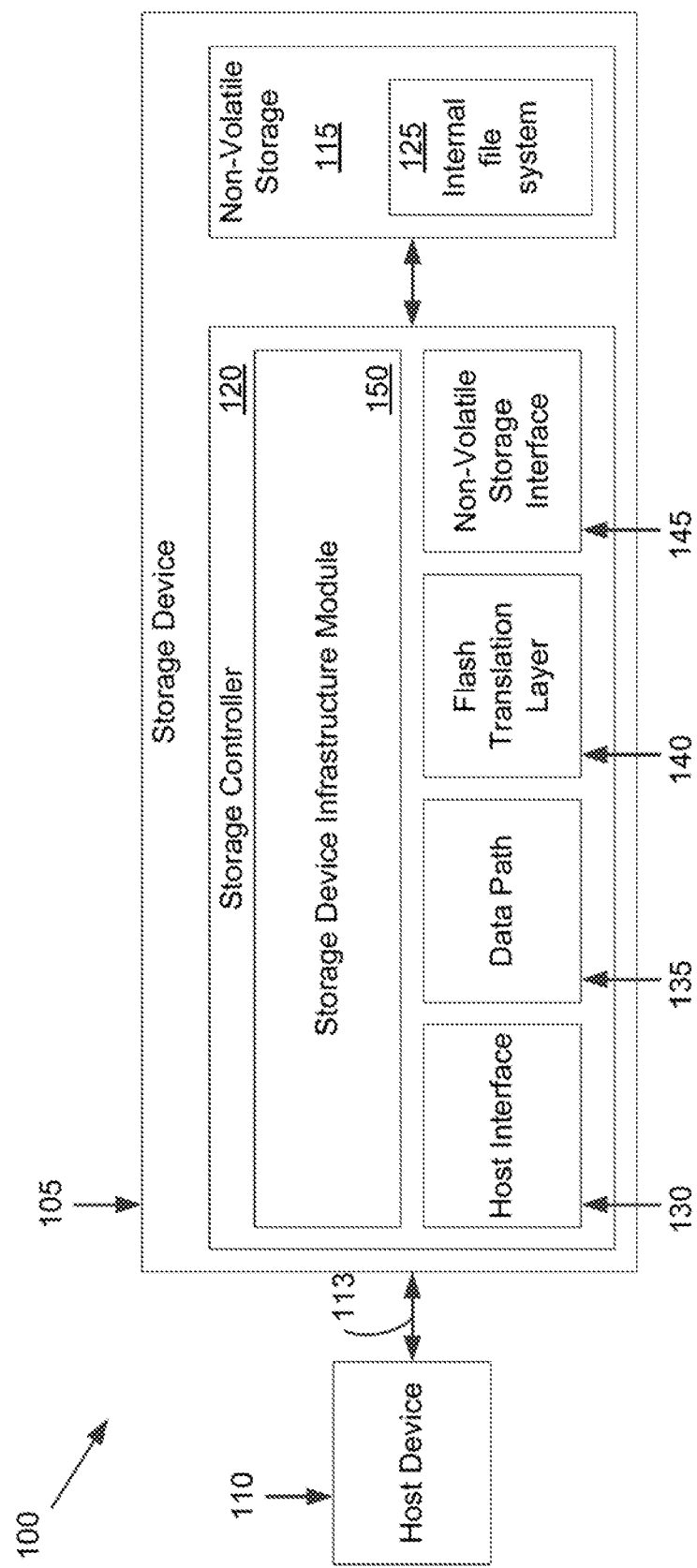
FIG. 1 is an example block diagram of a storage system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is directed to a storage system having a storage controller for facilitating communication between a host device and a non-volatile storage. The storage controller is configured with a plurality of firmware slots configured to run one or more different types of firmware. For example, in some embodiments, one of the plurality of firmware slots may be configured for a primary firmware and another one of the plurality of firmware slots may be configured for a secondary firmware. The present disclosure provides systems and methods in which the storage controller autonomously switches between the primary firmware and the secondary firmware without a switching request from the host device.

The primary firmware is a general firmware that is optimized for performance and power, and typically desired to be run during normal operations of the storage system. The primary firmware is not configured with a debug functionality and is, therefore, not suitable for identifying malfunctions within the storage system. The secondary firmware is a debug firmware configured to perform all or several of the operations that the primary firmware is configured to perform. Additionally, the secondary firmware is configured with debug functionality for gathering detailed information and facilitating diagnosis of a problem, issue, or malfunction within the storage system. The debug firmware may also be configured to repair the problem, issue, or malfunction after diagnosis. The debug firmware is not optimized for performance and power and is, therefore, less preferable than the primary firmware.

Thus, while it is desirable to use the primary firmware for a properly operating storage system, in cases where debug functionality to diagnose failures within the storage system is desired, the secondary firmware is used. Generally speaking, to use the secondary firmware, a firmware switch is made within the storage system from the primary firmware to the secondary firmware. Conventionally, the switch from the primary firmware to the secondary firmware is made manually. For example, in conventional approaches, a storage device vendor provides the secondary firmware to a customer of the storage system and the customer manually installs the secondary firmware on the non-volatile storage. The manual installation also requires making additional changes within the storage system such as, changes to the firmware executable image, requalification for the primary firmware images, etc. Upon installing the secondary firmware, the conventional mechanism further requires the customer to send a switching request via the host device to the storage controller to switch between the primary firmware and the secondary firmware. Further, when the debug functionality is not needed, the conventional approach requires the customer to send another switching request via the host device to facilitate the switch back to the primary firmware. Therefore, the conventional approach to update or switch between regular and debug functionality requires direct customer involvement, is time consuming, inefficient, and requires manual updates to the firmware.

In contrast, the present disclosure provides a system and method in which the primary and secondary firmware are simultaneously installed on the non-volatile storage and the storage controller autonomously switches between the primary and secondary firmware without any customer involvement and without any switching requests from the host device. Specifically, the storage controller includes a switcher module that automatically switches between the primary firmware and the secondary firmware based upon certain conditions being satisfied, as described in greater detail below.

Referring now to FIG. 1, an example block diagram of a storage system 100 is shown, in accordance with some embodiments of the present disclosure. The storage system 100 includes a storage device 105 in communication with a host device 110 via a physical interface 113. The storage device 105 may be a solid state drive ("SSD") including a non-volatile storage 115 and a storage controller 120. Other types of storage devices may be used in other embodiments. The host device 110 may be a computing device that is configured to communicate with the storage device 105 and other components not shown herein. Further, only some components of the storage system 100 are shown in FIG. 1. In other embodiments, components such as volatile storage, various interfaces, and components that are generally found in a storage system are contemplated and considered within the scope of the present disclosure.

The host device 110 communicates and interacts with the non-volatile storage 115 via the storage controller 120. For example, the host device 110 may send data to be stored or written into the non-volatile storage 115. The host device 110 may also retrieve or read data from the non-volatile storage 115. To communicate with the non-volatile storage 115, the host device 110 may send commands to the storage controller 120, which then services those commands from the non-volatile storage. For example, for a read operation, the host device 110 may send a read command to the storage controller 120, and the storage controller may service that read command by reading the data from the non-volatile storage 115 and returning the data back to the host device 110. Similarly, for a write operation, the host device 110 may send a write command and the data to be written to the storage controller 120. The storage controller 120 may write the data to the non-volatile storage 115, and then notify the host device that the data has been written. Similarly, the host device 110 may send other commands to the storage controller 120 to perform various operations on the non-volatile storage 115.

The non-volatile storage 115 includes one or more storage arrays having one or more memory cells configured to store one or more bits of data. The non-volatile storage 115 may be configured in a variety of ways. For example, in some embodiments, the non-volatile storage 115 may be configured as a flash storage or other type of solid state drive ("SSD") storage. In other embodiments, the non-volatile storage 115 may be other types of data storage devices. Furthermore, when configured as a flash storage, the non-volatile storage 115 may be a NAND, NOR, or another type of a flash storage. Additionally, each of the memory cells within the non-volatile storage 115 may be configured as a multi-level cell ("MLC") for storing multiple bits of data, a single-level cell ("SLC") for storing a single bit of data, or a combination thereof. Other features and/or configurations of the non-volatile storage 115 that are commonly needed and/or desirable to perform the functions described herein, are contemplated and considered within the scope of the present disclosure.

The non-volatile storage 115 may include an internal file system 125, which may be configured as a database of configuration data and firmware resources. In some embodiments, the internal file system 125 may be a flash file system. In other embodiments, other types of file systems may be used within the internal file system 125. Further, although not shown, the non-volatile storage 115 may include other components such as row and column decoders, sense modules, data latches, I/O circuits, batteries, cache memories, other on-chip circuitry, etc. to perform and control various operations of the non-volatile storage. In some embodiments, one or more of such components may be part of the storage controller 120. Additionally, although the non-volatile storage 115 has been shown separate from the storage controller 120, in some embodiments, the non-volatile storage and the storage controller may be integrated together into a single device (e.g., a single chip or die, a package with multiple dies, etc.).

As noted above, the storage controller 120 manages the operation of the non-volatile storage 115 and facilitates communication between the host device 110 and the non-volatile storage. Thus, the storage controller 120 includes a host interface 130, a data path 135, a flash translation layer 140, and a non-volatile storage interface 145. The host interface 130 may be an interface or component that facilitates communication of the host device 110 with the storage controller 120 via the data path 135. The host interface may be based on a variety of host controller interfaces such as Advanced Host Controller Interface, Universal Host Controller Interface, Open Host Controller Interface, Non-Volatile Memory Express (NVMe) Controller Interface, etc. The data path 135 of the storage controller 120 may include a variety of busses, processing units, and other circuitry to receive/send information from/to the host device 110, process the information, and send/receive the information to/from the non-volatile storage 115.

The flash translation layer 140 of the storage controller 120 is configured to map logical addresses received from the host device 110 into physical addresses of the non-volatile storage 115. The non-volatile storage interface 145 is configured to facilitate communication of the storage controller 120 with the non-volatile storage 115. Like the host interface 130, the non-volatile storage interface 145 may also be configured in a variety of ways as desired or needed to perform the functions described herein.

The storage controller 120 also includes a storage device infrastructure module 150, which implements various functions of the storage controller. The storage device infrastructure module 150 may be configured to control the operation of the storage controller 120 by running firmware level code or instructions. As discussed below, the storage device infrastructure module 150 may also be configured to autonomously switch between a primary firmware and a secondary firmware without a switching request from the host device 110. The storage device infrastructure module 150 is described in greater detail in FIG. 2 below.

It is to be understood that only certain components of the storage controller 120 are shown herein. Nevertheless, in other embodiments, additional, fewer, or different components may be provided within the storage controller as deemed necessary or desirable to perform the various functions described herein.

Figure 2:
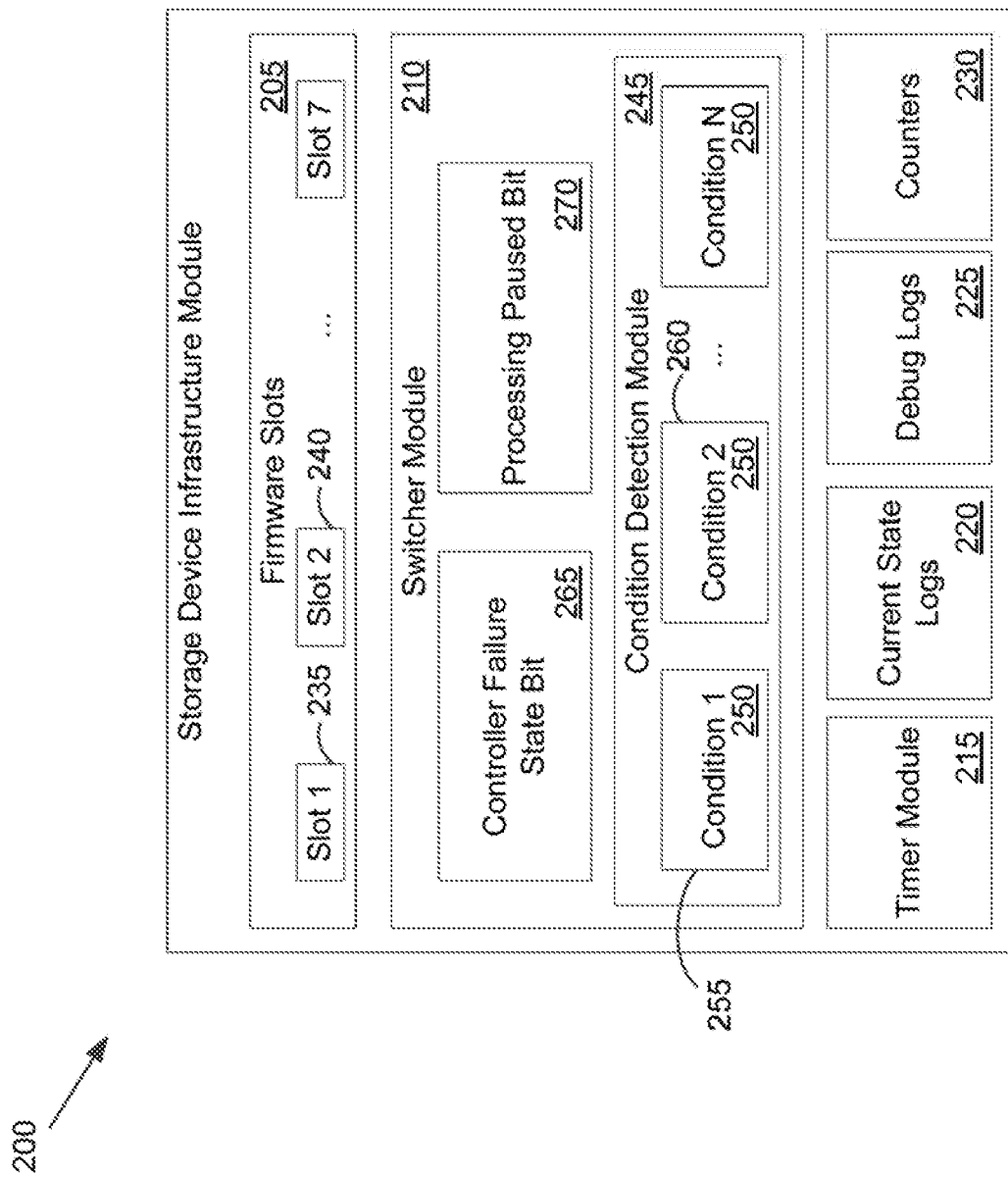
FIG. 2 is an example block diagram of a storage device infrastructure module used within the storage system, in accordance with some embodiments of the present disclosure.

Turning to FIG. 2, an example block diagram of a storage device infrastructure module 200 is shown, in accordance with some embodiments of the present disclosure. The storage device infrastructure module 200 includes a plurality of firmware slots 205, a switcher module 210, a timer module 215, current state logs 220, debug logs 225, and counters 230. It is to be understood that only certain components of the storage device infrastructure module 200 are shown herein. Other components that may be needed or desired to perform the functions described herein may be provided in other embodiments.

The plurality of firmware slots 205 are configured to hold various types of firmware that control, monitor, manipulate, and/or otherwise manage the operation of the storage controller 120, the non-volatile storage 115, as well as facilitate the communication between the host device 110 and the non-volatile storage. In some embodiments and as shown, the plurality of firmware slots 205 may include seven slots. In other embodiments, greater or fewer than seven of the plurality of firmware slots 205 may be used. Additionally, in some embodiments, each of the plurality of firmware slots 205 may be configured as a logical partition on the storage controller 120, although in other embodiments, one or more of the plurality of firmware slots may be configured in other ways.

By virtue of having the plurality of firmware slots 205, multiple types and/or versions of firmware may be simultaneously installed on the non-volatile storage 115. In some embodiments, each of the plurality of firmware slots 205 may be configured to hold one instance of firmware. Generally speaking, firmware is defined as a software program or set of instructions that are installed onto a non-volatile storage (e.g., the non-volatile storage 115 or a dedicated firmware non-voltage storage within or associated with the storage controller) and executed by the storage controller.

Further, each of the plurality of firmware slots 205 is configured to hold a specific type of firmware. The firmware that is stored within each of the plurality of firmware slots 205 may be basic input/output system firmware, diagnostic firmware, debug firmware, or any other type of firmware that is needed or desired for the operation of the storage system 100. In some embodiments, one of the plurality of firmware slots 205 may hold a primary firmware and another one of the plurality of firmware slots may hold a secondary firmware. The secondary firmware may be debug firmware having debug functionality and the primary firmware may be any firmware other than the debug firmware. Further, each of the plurality of firmware slots 205 may be specifically designated for holding the specific type of firmware. Thus, the primary firmware may only be held in slots that are designated for holding primary firmware. Similarly, the secondary firmware may be held in only those slots that are designated for holding secondary firmware.

Additionally, each of the plurality of firmware slots 205 may have associated therewith an identification number that associates a number with that particular slot and an identification type that associates a firmware type with that particular slot. Thus, from the identification number and the identification type, each of the plurality of firmware slots 205 may be uniquely identified and distinguished from other slots, and the type of firmware associated with that slot may be known. The identification number and the identification type may be known to the host device 110.

Further, only one type of firmware is used at a time. However, by installing multiple firmware simultaneously on the non-volatile storage 115 and by having the ability to switch between different types of firmware, a firmware suited for a particular type of operation may be selected. Conventionally, debug type of firmware is not stored within any of the plurality of firmware slots 205 at all times. Rather, when a debug functionality is desired (e.g., to identify malfunctions in the storage system 100), the debug firmware is manually installed in one of the plurality of firmware slots 205 that is designated for holding debug firmware and then uninstalled when the debug functionality is no longer required. In contrast, the present disclosure provides a mechanism by which the debug firmware may be held within one of the plurality of firmware slots 205 at all times and the storage controller 120 may automatically switch between the primary firmware (e.g., the non-debug firmware) and the secondary firmware (e.g., the debug firmware) when desired. For example, in some embodiments, the primary firmware may be held within a slot 235 and the secondary firmware may be held within slot 240 of the plurality of firmware slots 205 at all times.

Referring still to FIG. 2, the switcher module 210 facilitates the switch between the primary firmware and the secondary firmware based upon one or more conditions being satisfied. For example, the switcher module 210 may be configured to switch from the primary firmware to the secondary firmware based upon one or more debug conditions being satisfied. The switcher module 210 may also be configured to switch from the secondary firmware to the primary firmware based upon one or more switch-back conditions being satisfied. Both types of switching conditions are explained in greater detail below.

Further, the switcher module 210 may be configured as a software component, a hardware component, or a combination of software and hardware components. Additionally, in some embodiments and as shown, a single instance of the switcher module 210 may be used to facilitate a switch between the primary firmware and the secondary firmware. In other embodiments, multiple instances of the switcher module 210, with each switcher module assigned to switch between firmware of a subset of the plurality of firmware slots 205 may be used.

The switcher module 210 may include a condition detection module 245 that is configured to detect the debug conditions and the switch-back conditions. In some embodiments, the condition detection module 245 may include one or more condition modules 250, with each condition module being configured to detect and evaluate one or more debug conditions and/or one or more switch-back conditions. Thus, in some embodiments, one instance of the switcher module 210 may be configured to monitor a plurality of debug conditions and a plurality of switch-back conditions. In other embodiments, each instance of the switcher module 210 may be configured to monitor a single or a small group of debug conditions and/or a single or a small group of switch-back conditions.

Further, the debug conditions and the switch-back conditions may vary from one embodiment to another. For example, in some embodiments, a debug condition may be a link error debug condition. As used herein, a "link" refers to the physical interface 113 between the host device 110 and the storage device 105. "Link errors" may occur due to a poor signal connection in the physical interface 113 (e.g., failed connection) between the host device 110 and the storage device 105. The counters 230 may track all of the link errors that occur within the storage system 100. The switcher module 210 may be configured to monitor the link errors by monitoring the counters 230. The link error debug condition may be associated with a link error threshold, such that when the counters 230 indicate that the link error threshold has been met (e.g., by virtue of the number of link errors recorded by the counters meeting or exceeding the link error threshold), the switcher module 210 may determine that the link error debug condition has been satisfied. Further, the link error debug condition may be monitored by a condition module 255, which may be configured to monitor the counters 230. Upon meeting or exceeding the link error threshold associated with the link error debug condition, the condition module 255 may raise a flag or use another mechanism to indicate to the condition detection module 245 and/or the switcher module 210 that the link error debug condition has been satisfied.

Another debug condition that the switcher module 210 may be configured to monitor may include a temperature debug condition. For example, condition module 260 of the condition detection module 245 may be configured for the temperature debug condition. Specifically, the condition module 260 may include or be associated with one or more temperature sensors that are configured to measure temperature of one or more components within the storage system 100. If the one or more temperature sensors determine an unusual rise of temperature that is not associated with ambient temperature, significant variations in temperatures, etc., based upon the measured temperature exceeding a temperature threshold associated with the temperature debug condition, the condition module 260 may determine that the temperature debug condition has been satisfied. Similar to the condition module 255, the condition module 260 may be configured to raise a flag or indicate via another mechanism that the temperature debug condition has been detected.

Some debug conditions that the condition detection module 245 may be configured to monitor may be performance related. For example, the condition detection module 245 may be configured to detect latency and/or throughput problems. If the latency, throughput, or other performance related parameter exceeds a performance threshold, the condition detection module 245 may determine that a debug condition has been satisfied. One or more condition modules 250 may be designated for monitoring such performance related debug conditions. As an example, the storage controller 120 may be running a sequential read workload (e.g., executing read commands from the host device 110 to read data from the non-volatile storage 115). The designated instance(s) of the condition modules 250 may detect that for a similar rate of read commands coming in from the host device 110, the rate of reading from the non-volatile storage 115 has dropped by more than specified in the performance threshold. In such cases, the designated condition module(s) may determine that the performance debug condition has been satisfied and may flag the debug condition.

In some embodiments, the debug conditions may relate to error correction, rates of error occurrence, and any other condition that may be indicative or predictive of a problem or failure within the host device 110, the non-volatile storage 115, the storage controller 120, and any components associated therewith. It is to be understood that the debug conditions discussed above are simply an example. In other embodiments, additional, fewer, or different debug conditions may be monitored by the switcher module 210.

The debug conditions cause the switcher module 210 to switch from the primary firmware to the secondary firmware as discussed below. In contrast are the switch-back conditions, which cause the switcher module 210 to switch back from the secondary firmware to the primary firmware. The switch-back conditions may also vary from one embodiment to another. In some embodiments, the switch-back conditions may correspond to the debug conditions. For example, if the debug condition is a link error debug condition that is satisfied based upon the link errors meeting or exceeding the link error threshold, the corresponding switch back condition may be a link error switch-back condition. The link error switch-back condition may be associated with another link error threshold, which may be the same as or different from the link error threshold of the debug condition, and may identify when to switch back from the secondary firmware to the primary firmware.

In some embodiments, the switch-back conditions may not be associated with the debug conditions. For example, in some embodiments, regardless of the debug conditions, the switch-back conditions may be time based, such that the switcher module 210 switches back from the secondary firmware to the primary firmware after a certain period of time has elapsed. In yet other embodiments, a combination of associated and non-associated switch-back conditions may be used.

To monitor the debug and switch-back conditions, the condition detection module 245 may be configured to consult with the current state logs 220 and the counters 230. Specifically, each of the debug conditions and the switch-back conditions may have one or more parameters associated therewith. For example, the link error debug condition may have a link error parameter associated therewith. The temperature debug condition may have a temperature parameter associated therewith, and so on. These parameters may indicate the current state of operation of the storage system 100 and may be used to identify any problems or issues within the storage system. Further, data related to such parameters is typically gathered by the storage controller 120 in the current state logs 220 and the counters 230. The current state logs 220 and the counters 230, thus, provide a current state of the storage system 100. Based upon values of the parameters in the current state logs 220 and the counters 230, the switcher module 210 may determine whether the debug conditions and the switch-back conditions have been satisfied.

For example, in some embodiments, the current state logs 220 may include temperature logs that provide various temperature related information pertaining to one or more components of the storage system 100. Thus, for a temperature debug condition having a temperature parameter, the switcher module 210 may access and consult the temperature logs within the current state logs 220 for identifying whether the temperature debug condition has been satisfied. Similarly, the current state logs 220 may include information related to performance parameters (e.g., latency, throughput, etc.), and/or any several other parameters within the storage system 100 that may be monitored by the switcher module 210.

Similarly, the counters 230 may be used by the switcher module 210 in identifying the debug conditions and the switch-back conditions. For example, as discussed above, in some embodiments, the switcher module 210 may use the counters 230 to identify link error debug conditions. In other embodiments, the switcher module 210 may use the counters 230 for identifying other types of debug conditions as well. The counters 230 may monitor, for example, total number of commands coming in from the host device 110, number of host commands that are serviced by the storage controller, number of bytes that have been read from or written into the non-volatile storage 115, etc. Thus, the counters 230 may be configured to track a variety of parameters and the switcher module 210 may be configured to leverage the information from the counters in identifying the debug conditions and the switch-back conditions that have been satisfied.

It is to be understood that the current state logs 220 and the counters 230 are only one example of information sources that the switcher module 210 may use to monitor the various debug conditions and the switch-back conditions. In other embodiments, the switcher module 210 may use additional or other pieces of information from the host device 110, the non-volatile storage 115, and the storage controller 120 to identify the debug conditions and the switch-back conditions. In some embodiments, the switcher module 210 may be configured to monitor certain components of the host device 110, the non-volatile storage 115, and the storage controller 120 directly. Thus, the debug conditions and the switch-back conditions that the switcher module 210 may be configured to monitor may vary and the sources that the switcher module may use to monitor those conditions may also vary from one embodiment to another.

Furthermore, as noted above, the switcher module 210 may be configured in software, hardware, or a combination of hardware and software. In some embodiments, the configuration of the switcher module 210 may depend upon the debug conditions and the switch-back conditions that are desired to be monitored. Some conditions may be amenable for a software configuration, while other conditions may be more amenable for a hardware configuration. For example, temperature related conditions may be amenable to both hardware and software configurations. In a hardware configuration, temperature sensors may be used. In a software configuration, temperature information from the current state logs 220 may be used. Performance related conditions such as latency and throughput may be more suitable for a software based configuration. Thus, based upon the debug conditions and the switch-back conditions to be monitored, the switcher module 210 may be configured in software, hardware, or a combination of both.

Additionally, the switcher module 210 may be configured to monitor the various debug conditions and the switch-back conditions continuously or periodically. In some embodiments, the switcher module 210 may be configured to monitor some debug conditions and some switch-back conditions continuously while other debug conditions and switch-back conditions may be monitored periodically. For periodic monitoring, the switcher module 210 may use the timer module 215. The timer module 215 may be configured with a pre-determined time threshold, such that when the time threshold is met (e.g., the time set in the time threshold has passed), the switcher module 210 runs a check against the parameters of the debug conditions and the switch-back conditions that are to be monitored periodically. The timer module is then reset and runs again for the time threshold. Further, for the debug conditions and the switch-back conditions that are monitored periodically, the switcher module 210 may be configured to monitor each condition or a subset of conditions at varying time thresholds. Thus, based upon the debug conditions and the switch-back conditions that are desired to be monitored and the frequency of monitoring, the switcher module 210 and the timer module 215 may be configured. While the timer module 215 has been shown separate from the switcher module 210, in some embodiments, the timer module may be a part of and/or integrated with the switcher module.

Referring still to FIG. 2, if the switcher module 210 determines that one or more debug conditions indicative of a problem or failure have been satisfied, the switcher module may cause a firmware switch. Likewise, if the switcher module 210 determines that the switch-back conditions have been satisfied, the switcher module may switch again. In either situation, the switcher module 210 may facilitate the switch in one of two ways. For example, in some embodiments, the switcher module may use a controller failure state ("CFS") bit 265 to raise a host event (e.g., a flag or interrupt bit) to indicate to the host device 110 that the switcher module is switching the firmware. Enabling of the CFS bit 265 basically causes the host device 110 to reset the storage device 105 and particularly, the storage controller 120. Upon reset of the storage controller 120, the storage controller may stop execution of the firmware currently in execution and start execution of another firmware.

Another mechanism of facilitating the firmware switch is by using a processing paused ("PP") bit 270. Similar to the CFS bit 265, the PP bit 270 raises a host event (e.g., a flag or interrupt bit) to indicate to the host device 110 that the switcher module is switching the firmware. The PP bit 270 does not cause the host device 110 to reset the storage device 105. Rather, the PP bit 270 causes the storage device 105 and particularly, the storage controller 120 to go offline for a brief period of time during which the switcher module 210 stops execution of the currently running firmware and starts execution of another firmware. Additional details related to the CFS bit 265 and the PP bit 270 are discussed with respect to FIGS. 3 and 4 below.

Thus, the switcher module 210 monitors a variety of conditions indicative of a problem or failure within the storage system 100 and switches between the primary firmware and the secondary firmware autonomously without any input from the host device 110.

Figure 3:
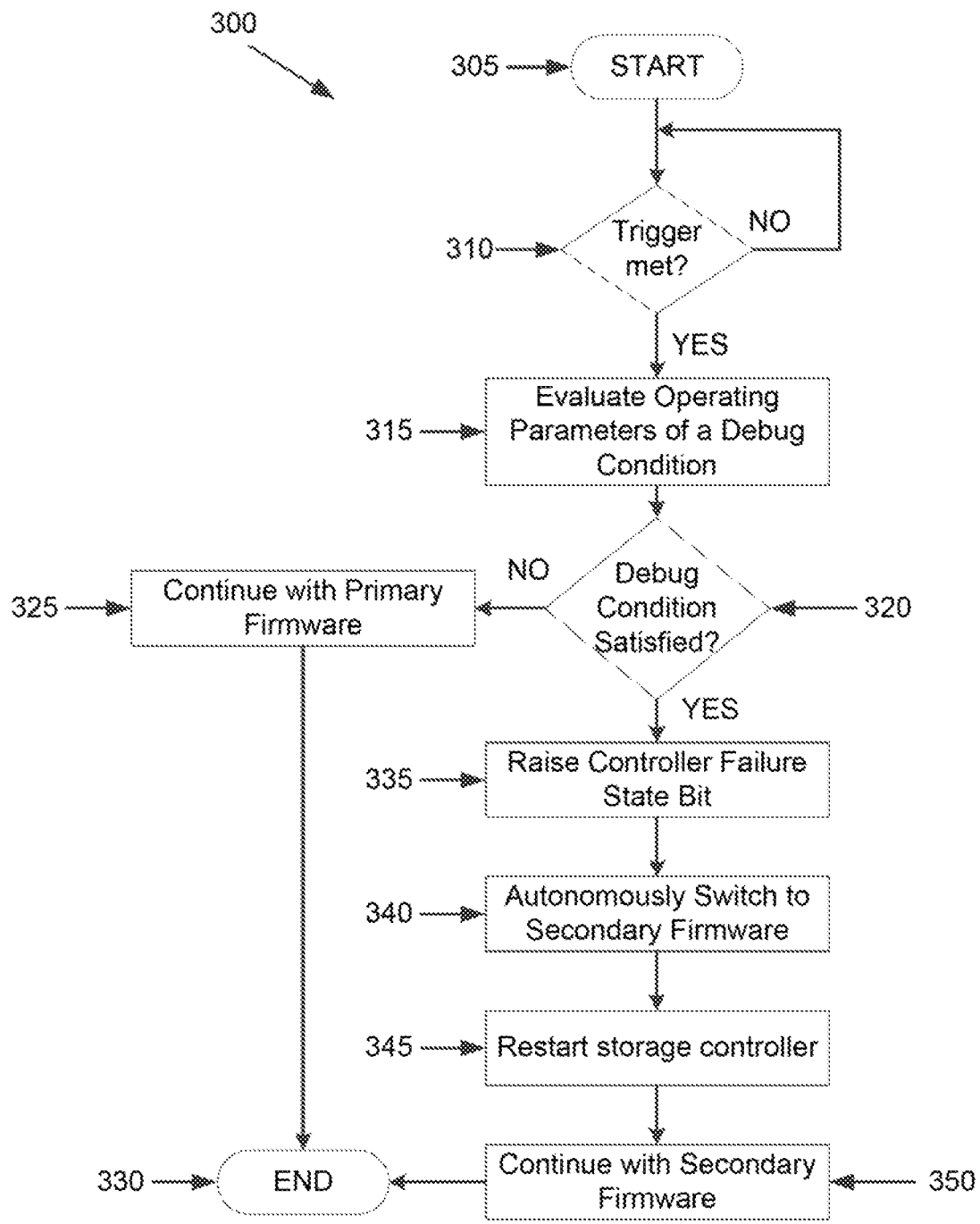
FIG. 3 is an example flow chart outlining operations for switching from a primary firmware to a secondary firmware, in accordance with some embodiments of the present disclosure.

Turning to FIG. 3, an example flowchart for a process 300 outlining operations for switching from a primary firmware to a secondary firmware using the CFS bit 265 is shown, in accordance with some embodiments of the present disclosure. The process 300 may include additional, fewer, or different operations, depending on the particular embodiment. After starting at operation 305, the switcher module 210 monitors one or more debug conditions that may be indicative of a problem or failure within the storage system 100. As indicated above, in some embodiments, the switcher module 210 may monitor the debug conditions periodically. Thus, at operation 310, the switcher module 210 determines if the time threshold within the timer module 215 has been met. For example, if the time threshold is one minute, when the timer module 215 indicates that one minute has passed, the switcher module 210 checks for any updates in the values of the parameters associated with the debug conditions being monitored. After the time threshold has been met, the timer module 215 resets and the time threshold restarts.

Further, in some embodiments, a different time threshold may be used for each debug condition. For example, the switcher module 210 may be configured to check for debug condition A every X seconds (or fractions of seconds) and debug condition B every Y seconds (or fractions of seconds). Thus, in some embodiments, the operation 310 may be performed for each debug condition that the switcher module 210 is monitoring. In some embodiments, triggers other than time (e.g., a critical warning event within the storage system 100) may be used at the operation 310. In embodiments where the switcher module 210 continuously monitors the debug conditions, the operation 310 may be skipped for the continuously monitored debug conditions. Thus, at the operation 310, if the trigger is met (e.g., if the timer threshold has been met), the switcher module 210 proceeds to operation 315. On the other hand, if the trigger is not met at the operation 310, the process 300 stays at the operation 310 until the trigger is met.

At the operation 315, the switcher module 210 evaluates the parameters associated with the debug conditions being monitored. Specifically, the switcher module 210 checks for any updates or changes since the last check in the values of the parameters associated with the debug conditions being monitored. As discussed above, the switcher module 210 may consult the current state logs 220, the counters 230, and any other source within the storage system 100 to identify the updates or changes in the parameters. Thus, for each debug condition for which the trigger is met at the operation 310, the switcher module 210 checks for updates in the parameters.

Based upon the information gathered at the operation 315, the switcher module 210 decides at operation 320 whether to switch from the primary firmware to the secondary firmware. As discussed above, each debug condition that the switcher module 210 is monitoring has a threshold value associated with it. The switcher module 210 may compare the value of the parameter obtained at the operation 315 with the threshold value at the operation 320. If the comparison indicates that the value of the parameter is equal to or greater than the temperature threshold (or in some cases lower than the threshold), the switcher module may determine that the debug condition has been satisfied and that there is an occurring or impending problem within the storage system 100.

In some embodiments, the switcher module 210 may be configured such that every instance of satisfaction of the debug condition does not cause a firmware switch. For example, for a temperature debug condition, the switcher module 210 may be programmed to facilitate a firmware switch only if the temperature value obtained at the operation 315 exceeds the temperature threshold for a specific amount of time. Specifically, if for example, the switcher module 210 has been configured to monitor the temperature related condition every minute and further configured to switch the firmware if the temperature value exceeds the temperature threshold continuously for five minutes, the switcher module switches the firmware only after the temperature value exceeds the temperature threshold for five continuous cycles.

Thus, the switcher module 210 may be configured with a variety of criteria for monitoring the debug conditions. If the switcher module 210 determines that the criteria for switching the firmware has not been met at the operation 320, the switcher module continues operating with the primary firmware, as indicated at operation 325. The process 300 ends at operation 330, with the switcher module 210 continuing to monitor the debug condition as indicated at the operations 310-320. On the other hand, if at the operation 320, the switcher module 210 determines that the criteria to switch the firmware has been met, the switcher module starts the process of switching from the primary firmware to the secondary firmware at operation 335.

To switch the firmware, the switcher module 210 raises a host event using the CFS bit 265 at the operation 335. Raising the host event may involve raising or setting a flag bit or an interrupt bit. Raising the host event requests the host device 110 to reset the storage controller 120. Upon receiving the host event, the host device 110 resets the storage controller 120. In some embodiments, a "reset" may mean stop operation of the storage controller 120 for a brief amount of time and restart the storage controller after the brief amount of time has passed.

By virtue of resetting the storage controller 120, any in-flight commands that are in the process of being transmitted from the host device 110 to the storage controller are dropped or lost, requiring the host device to re-submit those commands after the reset. Any commands that have already been transmitted to the storage controller 120 may be serviced and completed before the reset occurs. In some embodiments, the storage controller 120 may be configured to process the in-flight commands as well before the reset to avoid loss of those commands. For example, if the host device 110 has sent one or more read commands to the storage controller 120 to read data from the non-volatile storage 115, any of those read commands that have not yet reached the storage controller 120 when the storage controller is reset are lost or dropped, requiring the host device to resubmit those lost commands after the firmware switch. If those read commands have already reached the storage controller 120, the storage controller may service and complete processing those read commands before resetting. Further, when the storage controller 120 is being reset, the host device 110 may be prevented from sending any new commands to the storage controller. Upon raising the host event and causing the host device 110 to reset the storage controller 120, the switcher module 210 facilitates the firmware switch at operation 340.

Specifically, to facilitate the switch from the primary firmware to the secondary firmware at the operation 340, the switcher module stops execution of the primary firmware and starts execution of the secondary firmware. Since the secondary firmware is already installed into the plurality of firmware slots 205 of the storage controller 120, the switcher module autonomously switches from the primary firmware to the secondary firmware without any manual intervention from a user and without a switching request from the host device 110. Upon completing the switch, the reset operation, which reset the storage controller at the operation 335, is complete and the storage controller 120 is restarted at operation 345. By virtue of restarting the storage controller 120 at the operation 345, the host device 110 may resubmit the commands that were lost during the resetting of the non-volatile storage at the operation 335, as well as submit new commands. Further, the flag or interrupt bit set at the operation 320 is disabled.

Further, in addition to providing the normal functionalities of the primary firmware, the secondary firmware provides a debug functionality that gathers detailed information regarding the debug condition that caused the switch and stores that information within the debug logs 225 (See FIG. 2). The host device 110, the storage controller 120, and the non-volatile storage 115 continue their operations using the secondary firmware, as noted at operation 350 and the process 300 ends at the operation 330, with the switcher module 210 continuing to monitor the debug condition that facilitated the switch.

Figure 4:
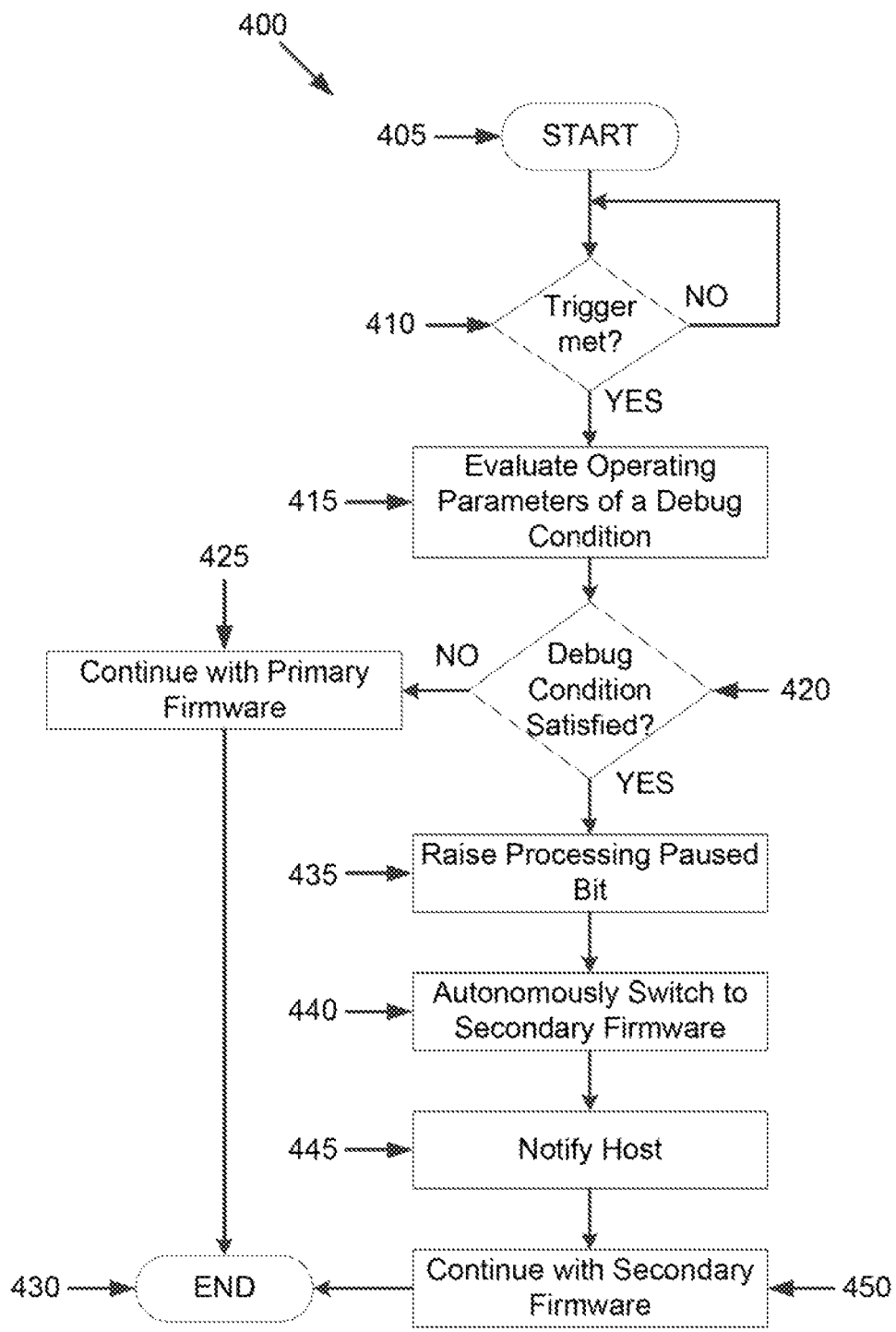
FIG. 4 is an example flow chart outlining operations for switching from the primary firmware to the secondary firmware, in accordance with some other embodiments of the present disclosure.

Turning now to FIG. 4, an example flowchart outlining operations for a process 400 is shown, in accordance with some embodiments of the present disclosure. The process 400 outlines operations for switching from a primary firmware to a secondary firmware using the PP bit 270. The process 400 may include additional, fewer, or different operations, depending on the particular embodiment. The process 400 is somewhat similar to the process 300 described above. Thus, after starting at operation 405, the switcher module 210 determines whether the time threshold has been met at operation 410. The operation 410 is analogous to the operation 310 described above. Thus, if the timer module 215 indicates that the time threshold has been met, the switcher module evaluates the parameters associated with the debug conditions being monitored at operation 415. If the timer module 215 indicates that the time threshold has not been met, the process 400 remains at the operation 410 until the time threshold has been met.

At the operation 415, the switcher module 210 checks for updates in the parameters of the debug conditions that the switcher module is monitoring. The operation 415 is analogous to the operation 315. At operation 420, the switcher module 210 determines if a firmware switch is needed. Again, the switcher module 210 may compare the values of the parameters obtained at the operation 415 with one or more thresholds and other criteria programmed within the debug condition. If the switcher module 210 determines that conditions for a firmware switch are not satisfied, at operation 425, the primary firmware is continued to be used and the process 400 ends at operation 430.

If at the operation 420, the switcher module 210 decides that the conditions for making the firmware switch have been met, at operation 435, the switcher module starts the switching process. At the operation 435, the switcher module raises a host event. Specifically, the switcher module 210 uses the PP bit 270 to set or raise a flag or interrupt bit that halts the processing of any new commands from the host device 110 for a short period of time. The storage controller 120 may continue processing any existing commands from the host device 110 when the PP bit 270 is used to facilitate the switch. The PP bit 270 also notifies (e.g., using an asynchronous event) the host device 110 that the processing of the non-volatile storage 115 has been paused or halted for a brief period of time. However, in contrast to the CFS mechanism of switching described above with respect to the operation 335 in which the in-flight commands from the host device 110 are lost, the PP mechanism of switching does not cause the in-flight commands from the host device to be lost.

Rather, the in-flight commands may be queued within the storage controller 120 until the firmware switch is completed. The host device 110 may also continue to send new commands to the storage controller for accessing the non-volatile storage 115. The new commands may be queued along with the other commands from the host device 110. Thus, the PP mechanism of switching does not cause any interruption in the operation of the host device 110 other than perhaps a delayed response time for the time period during which the firmware switch is taking place. The decision to use the CFS mechanism or the PP mechanism may be made by the switcher module 210 based upon the specific debug condition that led to the firmware switch and/or the seriousness of the problem or issue caused by the condition causing the switch.

At operation 440, upon raising the PP flag or interrupt bit via the PP bit 270, the switcher module 210 stops execution of the primary firmware and starts execution of the secondary firmware. Again, the switcher module 210 facilitates the switch from the primary firmware to the secondary firmware without any switching request from the host device 110 or any intervention from the customer. Thus, the switcher module 210 autonomously switches the firmware. Upon completing the switch, the switcher module 210 notifies (e.g., using an asynchronous event) the host device 110 that the firmware has been switched at operation 445. The PP flag or interrupt bit that was raised at the operation 435 may be disabled and the secondary firmware picks up where the primary firmware left off. Thus, at operation 450, the secondary firmware services all of the pending commands from the host device 110 that were queued at the operation 435. In addition to providing the normal functionalities of the primary firmware, the secondary firmware provides a debug functionality that gathers detailed information regarding the condition that caused the switch and stores that information within the debug logs 225 (See FIG. 2). In some embodiments, the secondary firmware may possibly suggest and/or fix the problems indicated in the debug condition causing the switch. The process 400 ends at the operation 430.

Figure 5:
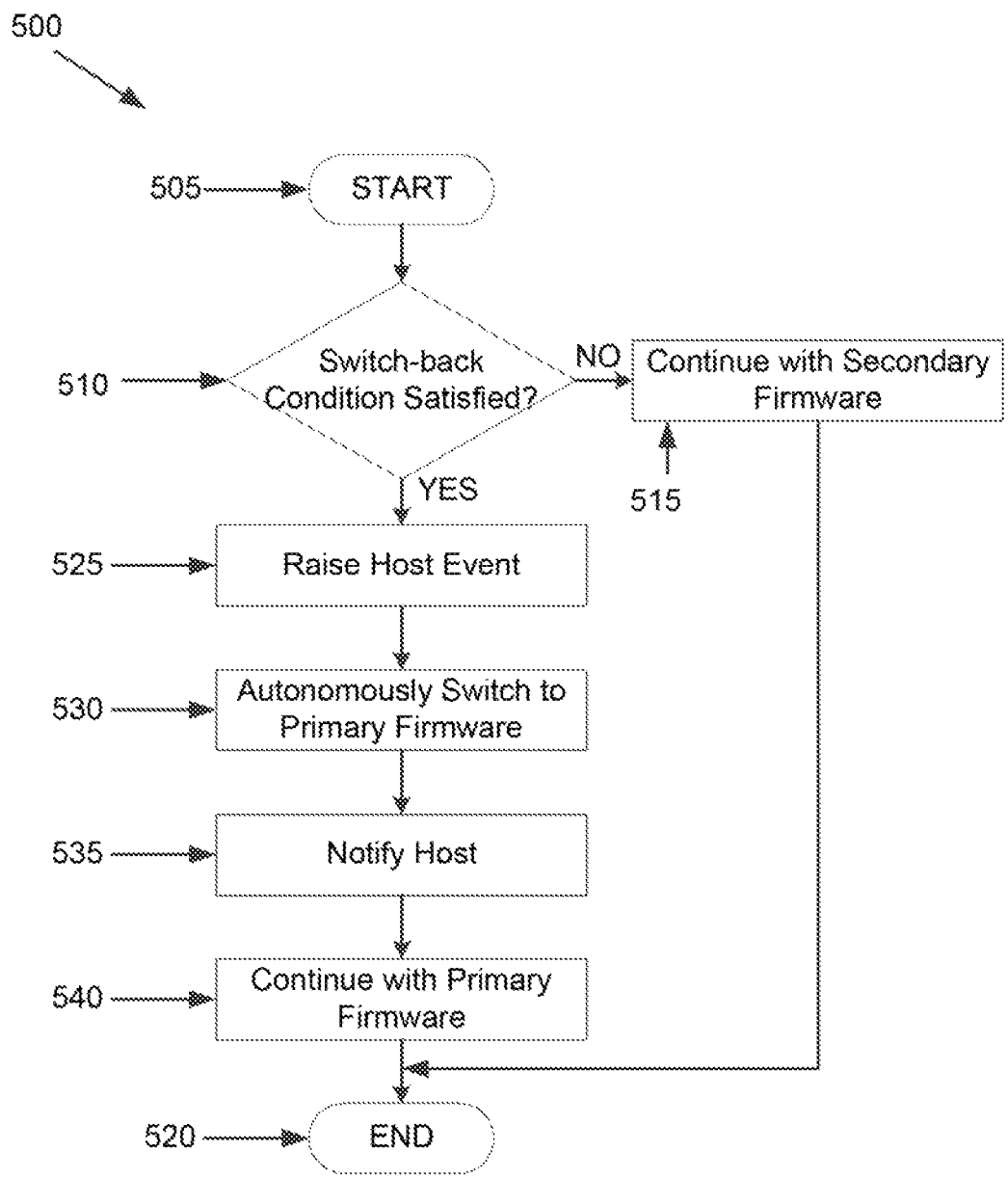
FIG. 5 is an example flowchart outlining operations for switching from the secondary firmware to the primary firmware, in accordance with some embodiments of the present disclosure.

Referring now to FIG. 5, an example flowchart outlining a process 500 for switching from the secondary firmware back to the primary firmware is shown, in accordance with some embodiments of the present disclosure. The process 500 may include additional, fewer, or different operations, depending on the particular embodiment. The process 500 starts at operation 505 with the secondary firmware in execution. Since the secondary firmware is not optimized for performance and power, it may be desirable to switch the firmware back to the primary firmware once the debug data has been collected in the debug logs 225 and/or the problem that caused the switch has been remedied. As discussed above, the primary firmware is optimized for power and performance and is therefore more desirable than the secondary firmware. It is to be understood that the primary firmware to which the secondary firmware is switched may be the same firmware from which the switch to the secondary firmware was made at the processes 300 or 400, or the primary firmware may be a different primary firmware.

At operation 510, the switcher module 210 determines whether the switch-back conditions for switching from the secondary firmware to the primary firmware have been met.

For example, the switcher module 210 may be configured to switch back to the primary firmware after a pre-determined period of time has passed. The pre-determined period of time may be programmed based upon how long it would normally take the secondary firmware to gather the debug data and/or fix the problem. In other embodiments, the switcher module 210 may be configured to switch back to the primary firmware after the secondary firmware has sent the collected debug data to a vendor or other entity for resolving the problem. In yet other embodiments, additional or other switch-back conditions may be used.

If the switcher module 210 determines that the secondary-to-primary firmware switch may not be made yet, the process 500 proceeds to operation 515 where the execution continues with the secondary firmware and the process ends at operation 520 with the switcher module continuing to monitor the switch-back conditions. On the other hand, if at the operation 510, the switcher module 210 determines that the switch-back conditions for making the switch back to the primary firmware have been satisfied, at operation 525, the switcher module raises a host event at operation 525. The host event may be an interrupt, a flag, or other notification bit. Further, the host event may be raised using either the CFS bit 265 or the PP bit 270. Again, if the CFS bit 265 is used, the switcher module 210 causes the host device 110 to reset the storage controller 120 and some of the commands from the host device may be lost. If the PP bit 270 is used, the switcher module 210 may pause the processing of the commands from the host device 110 for a brief period of time and any commands from the host device 110 that are not immediately services are queued (but not lost).

In some embodiments, the switcher module 210 may use the same switching mechanism (e.g., CFS or PP) that the switcher module used when switching from the primary firmware to the secondary firmware. In other embodiments, the switcher module 210 may use the other mechanism than used for switching from the primary firmware to the secondary firmware. Upon raising the host event at the operation 530, the switcher module 210 stops execution of the secondary firmware and starts execution of the primary firmware. Upon completing the switch, the switcher module 210 notifies the host device 110 of the switch at operation 535 and at operation 540, the primary firmware picks up where the secondary firmware left off. The process 500 ends at operation 520. Thus, the switcher module also facilitates the switching from the secondary to the primary firmware without any switching request from the host device 110 or any intervention from the customer.

Therefore, the present disclosure provides a system and method for switching from one firmware to another firmware without any user intervention and without any specific request from the host device 110. The switcher module 210 monitors one or more conditions indicative of a problem or failure within the storage system 100 and automatically triggers the firmware switch when at least one of the one or more conditions are satisfied. Advantageously, the autonomous switching of the firmware by the switcher module without having the host device sending a request to switch firmware is fast, automatic, allows the debug functionality to be installed on the storage controller 120 simultaneously with the regular firmware, and leads to an efficient and convenient diagnosis of problems or issues within the storage system. Thus, the switcher module 210 may cause problems in the storage system 100 to be identified in advance of the problem actually occurring and significantly impacting the operation of the storage system.

The following description is directed to certain implementations for the purposes of describing the innovative aspects of this disclosure. However, a person having ordinary skill in the art will readily recognize that the teachings herein can be applied in a multitude of different ways.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
   determining, by a switcher module of a storage controller, satisfaction of a debug condition based upon values of parameters of the debug condition, wherein the debug condition indicates a problem within a storage system comprising the storage controller that facilitates communication between a host device and a non-volatile storage of the storage system;
   switching, by the switcher module, operation of the storage system from a primary firmware that is optimized for at least one of performance and power to a secondary firmware based upon the determination of the switcher module that the debug condition has been satisfied, wherein:
      the switching from the primary firmware to the secondary firmware occurs automatically without a switching request from the host device; and
      the secondary firmware is debug firmware configured to fix the debug condition;
   collecting information regarding the debug condition while operating from the secondary firmware; and
   subsequently switching back to the primary firmware.

2. The method of claim 1, further comprising:
   raising a host event by the switcher module upon determining that the debug condition has been satisfied, wherein the host event is raised using a controller failure state bit in which the host device resets the storage controller.

3. The method of claim 1, further comprising:
   raising a host event by the switcher module upon determining that the debug condition has been satisfied, wherein the host event is raised using a processing paused bit in which the switcher module pauses processing of host commands for a pre-determined time period.

4. The method of claim 1, further comprising:
   evaluating, by the switcher module, one or more switch-back conditions for switching back from the secondary firmware to the primary firmware, the switch-back conditions including at least one of fixing the debug condition, sending the information regarding the debug condition, and passing of a predetermined period of time sufficient to fix the debug condition or gather the information;
   raising, by the switcher module, a host event for switching back from the secondary firmware to the primary firmware based upon at least one of the one or more switch-back conditions being satisfied;
   stopping execution, by the switcher module, of the secondary firmware; and
   starting execution, by the switcher module, of the primary firmware.

5. The method of claim 4, wherein the host event is raised by setting either a controller failure state bit or a processing paused bit by the switcher module.

6. The method of claim 4, further comprising notifying the host device of the switch from the secondary firmware to the primary firmware.

7. The method of claim 4, wherein the switch from the secondary firmware to the primary firmware occurs automatically without the storage controller receiving the switching request from the host device.

8. The method of claim 1, further comprising:
   comparing, by the switcher module, the values of the parameters with one or more pre-determined thresholds associated with the debug condition; and
   determining, by the switcher module, that the debug condition has been satisfied based upon the values meeting or exceeding the one or more pre-determined thresholds.

9. The method of claim 1, further comprising checking for updates in the parameters of the debug condition periodically based upon a pre-determined time threshold.

10. The method of claim 9, further comprising accessing by the switcher module at least one of a current state log and a counter within the storage system for checking for updates in the parameters of the debug condition.

11. A storage controller comprising:
    a plurality of firmware slots, a first slot of the plurality of firmware slots having a primary firmware installed therein and a second slot of the plurality of firmware slots having a secondary firmware installed therein, the secondary firmware being a debug firmware configured to diagnose one or more problems within a storage system comprising the storage controller, a host device in communication with the storage controller, and a non-volatile storage; and
    a switcher module configured to:
       automatically switch from the primary firmware to the secondary firmware based upon satisfaction of one or more debug conditions to enable gathering debug information by the secondary firmware;
       switch from the primary firmware to the secondary firmware without a switching request from the host device; and
       switch from the primary firmware to the secondary firmware by raising a processing paused bit which causes the switcher module to pause processing of host commands for a pre-determined time period.

12. The storage controller of claim 11, wherein the debug conditions include at least one of: a number of link errors in a link with a host, a temperature condition, a latency problem, a throughput problem, and an error rate.

13. The storage controller of claim 11, further comprising a timer module in operational association with the switcher module, wherein the timer module is configured with a time threshold, and wherein the switcher module is configured to evaluate the satisfaction of the one or more conditions based upon the time threshold being met or exceeded.

14. The storage controller of claim 11, wherein:
the one or more debug conditions indicate one or more problems within at least one of the storage controller, the host device, and a non-volatile storage in communication with the host device via the storage controller, the secondary firmware including debug functionality related to the one or more problems;
the switcher module is configured to compare parameters associated with the debug conditions with one or more thresholds to identify the satisfaction of the debug conditions; and
the switcher module is configured to switch from the primary firmware to the secondary firmware based upon the satisfaction of the debug conditions to enable the debug functionality.

15. The storage controller of claim 11, wherein:
the switcher module is further configured to switch from the secondary firmware to the primary firmware based upon the satisfaction of one or more switch-back conditions that are indicative of a diagnosis of the one or more problems; and
the switcher module is configured to switch from the secondary firmware to the primary firmware without a switching request from the host device.

16. The storage controller of claim 11, wherein the non-volatile storage is flash storage.

17. The storage controller of claim 11, wherein:
the primary firmware is optimized for at least one of performance and power; and
the secondary firmware is configured to fix the debug condition.

18. A storage system comprising:
a host device;
a non-volatile storage; and
a storage controller configured to facilitate communication between the host device and the non-volatile storage, wherein:
the storage controller comprises a means for automatically switching between a primary firmware that is optimized for at least one of performance and power and a secondary firmware based upon satisfaction of one or more debug conditions;
the secondary firmware is debug firmware that includes debug functionality directed to fixing the one or more debug conditions; and
the means for automatically switching is configured to automatically switch between the primary firmware and the secondary firmware without a switching request from the host device.

19. The storage system of claim 18, wherein the means for automatically switching is further configured to automatically switch back from the secondary firmware to the primary firmware based upon one or more switch-back conditions being satisfied.

20. The storage system of claim 18, wherein the non-volatile storage is flash storage.

* * * * *